United States Patent
Shiohara

(10) Patent No.: US 10,185,519 B2
(45) Date of Patent: *Jan. 22, 2019

(54) DOCUMENT PROCESSING APPARATUS, CONTROL METHOD, AND STORAGE MEDIUM

(71) Applicant: CANON KABUSHIKI KAISHA, Tokyo (JP)

(72) Inventor: Tetsuya Shiohara, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,027

(22) Filed: Mar. 9, 2017

(65) Prior Publication Data
US 2017/0177279 A1 Jun. 22, 2017

Related U.S. Application Data

(63) Continuation of application No. 12/954,126, filed on Nov. 24, 2010, now Pat. No. 9,619,183.

(51) Int. Cl.
*G06F 3/12* (2006.01)

(52) U.S. Cl.
CPC ........... *G06F 3/1205* (2013.01); *G06F 3/125* (2013.01); *G06F 3/1208* (2013.01); *G06F 3/1227* (2013.01); *G06F 3/1246* (2013.01); *G06F 3/1254* (2013.01); *G06F 3/1262* (2013.01); *G06F 3/1277* (2013.01); *G06F 3/1285* (2013.01)

(58) Field of Classification Search
None
See application file for complete search history.

(56) References Cited

U.S. PATENT DOCUMENTS 9,619,183 B2 * 4/2017 Shiohara ............... G06F 3/1205
2007/0171450 A1 * 7/2007 Yoshida ............ G06F 3/04817
358/1.13

* cited by examiner

*Primary Examiner* — John R Wallace
(74) *Attorney, Agent, or Firm* — Canon U.S.A., Inc. I.P. Division

(57) ABSTRACT

A PrintTicket does not necessarily exist in each page of an XPS document. Regarding a page where no PrintTicket exists, the page is printed by referring to a PrintTicket in a higher hierarchical level. Here, when a plurality of XPS documents are combined, a user's intended print result may not be obtained when the PrintTicket in the higher hierarchical level to which the page refers changes before and after combining. Before a combining process is executed, print setting information of a page element is generated based on print setting information of an element in a higher hierarchical level than the page hierarchical level. A combined document is generated by combining a structured document including a page element to which the generated print setting information is added and another structured document including a page element to which the generated print setting information is added.

15 Claims, 10 Drawing Sheets

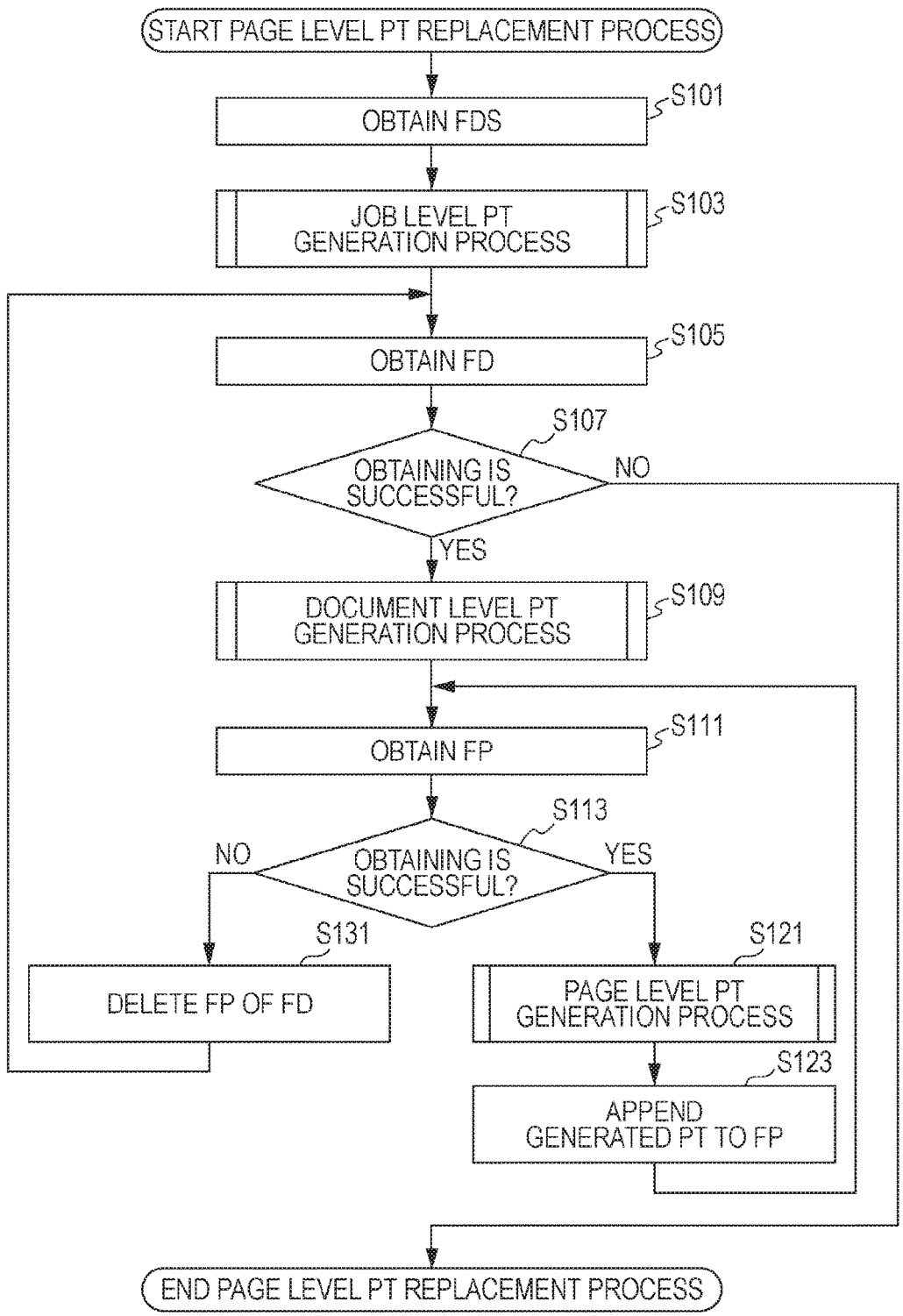

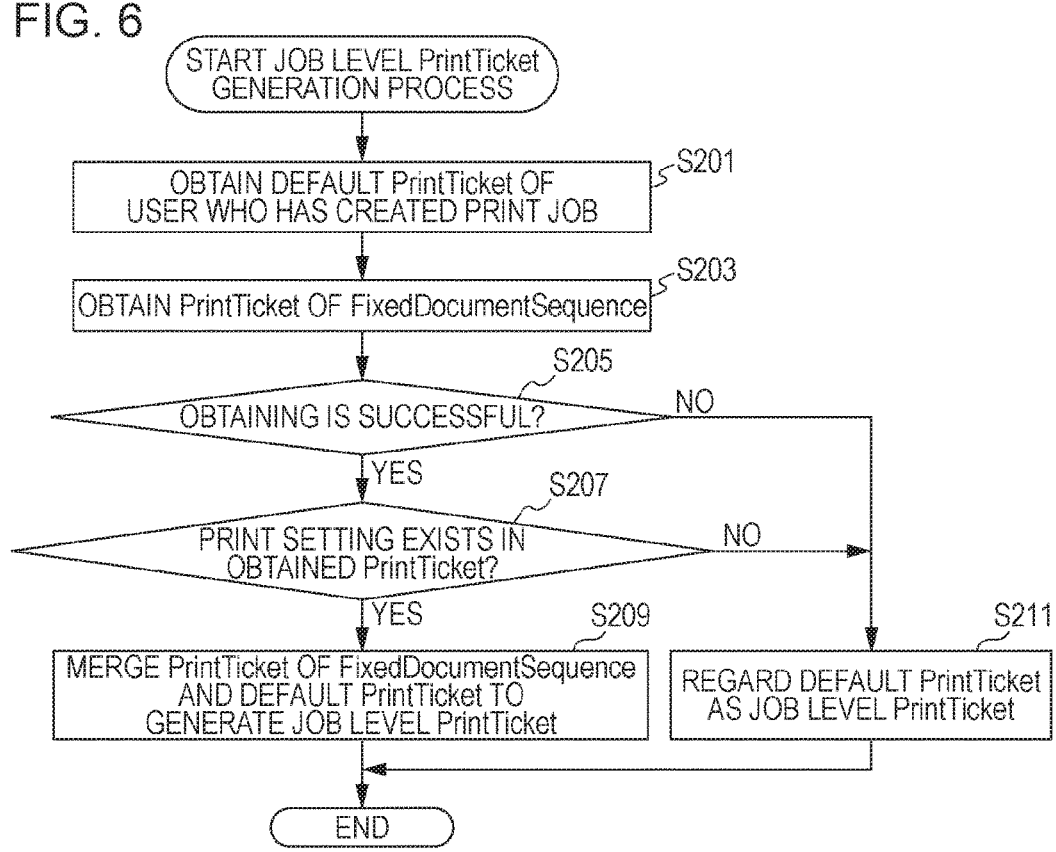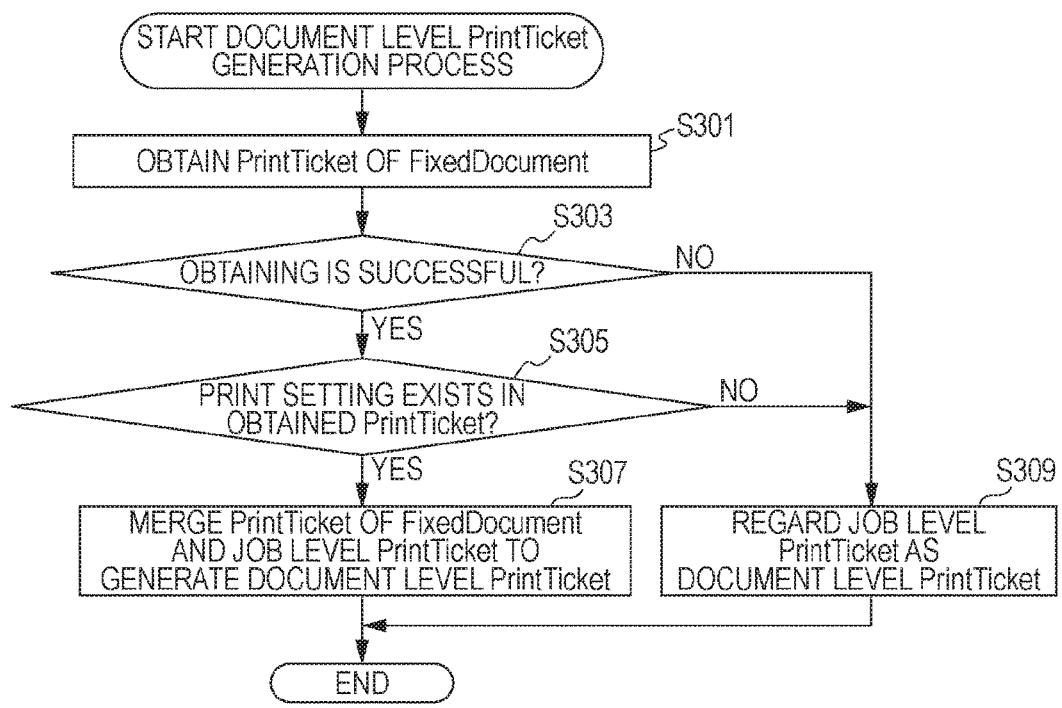

DOCUMENT PROCESSING APPARATUS, CONTROL METHOD, AND STORAGE MEDIUM

CROSS-REFERENCE TO RELATED APPLICATIONS

This application is a continuation, and claims the benefit, of U.S. patent application Ser. No. 12/954,126, presently pending and filed on Nov. 24, 2010, which claims the benefit of International Patent Application No. PCT/JP2009/069983, filed Nov. 26, 2009, all of which are hereby incorporated by reference herein in their entireties.

BACKGROUND OF THE INVENTION

Technical Field

The present invention relates to a method of combining a plurality of structured documents.

Background Art

Hitherto, at the time of performing printing, duplex printing, layout printing (also called N-up printing) for printing a plurality of pages on a face of a single sheet, or the like has been set as print setting information for saving paper and ink.

However, these items of print setting information are not set over a plurality of print jobs. Therefore, when a plurality of print jobs are generated while designating, for example, duplex printing of a plurality of documents with odd pages, the back face of the last page of a printed matter of each print job becomes a blank page. Thus, there is an issue such that sheet saving cannot be efficiently realized.

In response to this issue, the technique of combining a plurality of print jobs and handling the combined print jobs as a single print job is disclosed in Japanese Patent Laid-Open No. 11-243463. A plurality of print jobs are combined to generate a single combined print job, and duplex printing is set for this combined print job. As a result, for example, when the last page of the first print job included in the combined print job is arranged on the front face of a sheet, the first page of the second print job included in the combined print job can be arranged on the back face of the same sheet.

Also, a printing system different from conventional printing systems has been appearing in recent years. In this new printing system, the XPS format, instead of the conventional EMF format (Enhanced Meta File), is used as a data format stored in a spool file. XPS, which will be described later using FIG. 1, is an electronic document format that is an open standard developed by Microsoft. XPS can have a PrintTicket, which is XML data describing print setting information, for each element such as a page.

SUMMARY OF INVENTION

As described above, an XPS document can have a PrintTicket describing print setting information for each page. Therefore, when a plurality of XPS documents that are print jobs are combined, the XPS documents can be combined while maintaining print setting information of each page.

However, a PrintTicket does not necessarily exist in each page of an XPS document. A page where no PrintTicket exists is printed by referring to a PrintTicket in a higher hierarchical level.

Here, when a plurality of XPS documents are combined, a user's intended print result may not be obtained when the PrintTicket in the higher hierarchical level to which a reference shall be made by the page changes before and after combining.

To this end, a method for obtaining a user's intended print result even when a plurality of XPS documents are combined is proposed.

To solve the above-described problem, there is provided a document processing apparatus that executes a combining process of combining a plurality of structured documents, each structured document being constructed of elements in a plurality of hierarchical levels and including at least one page element, including: an obtaining unit for obtaining, in order to generate print setting information of a page element included in the structured document, print setting information of an element in a higher hierarchical level than the page element; a generation unit for generating, before the combining process is executed, print setting information of the page element based on the print setting information of the element in the higher hierarchical level, which is obtained by the obtaining unit; and a combining unit for combining a structured document including a page element to which the print setting information generated by the generation unit is added and another structured document including a page element to which the print setting information generated by the generation unit is added.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the present invention.

FIG. 5 is a diagram illustrating a process of replacing PrintTickets of FixedPages according to a first embodiment.

FIG. 6 is a diagram illustrating an example of a job level PT generation process of the present invention.

FIG. 7 is a diagram illustrating an example of a document level PT generation process of the present invention.

DESCRIPTION OF EMBODIMENTS

Hereinafter, preferred embodiments of the present invention will be described in detail with reference to the accompanying drawings. Note that the embodiments below are not intended to restrict the present invention according to claims, and not all combinations of features described in the embodiments are essential in a solution of the present invention.

First Embodiment

Structure of XPS Document

To facilitate the understanding of the present description, XPS will be briefly described at first. XPS is the abbreviation of XML Paper Specification and is one of electronic document formats that are open standards developed by Microsoft. An XPS document has a tree structure with a FixedDocumentSequence (hereinafter called an FDS) as a root. An FDS can have a plurality of FixedDocuments (hereinafter called FDs), and an FD can have a plurality of FixedPages (hereinafter called FPs). Each of an FDS, an FD, and an FP may be called an XPS part (or element). That is, an XPS document is constructed of page elements, document elements, and job elements.

An FP describes details of a page of a document in the XML format and includes details that are actually displayed or printed. Resources such as fonts or images used for printing details of a page can be shared among a plurality of FPs. Also, each of an FDS, an FD, and an FP can have print setting information as a PrintTicket (hereinafter called a PT). A PT is data describing, in the XML format, print setting information at the time of printing an XPS document. Here, print setting information used at the time of printing each FP corresponds to a PT obtained by merging a PT of an FSD, a PT of a parent FD of the FP to be printed, and a PT of the FP to be printed.

Figure 1:
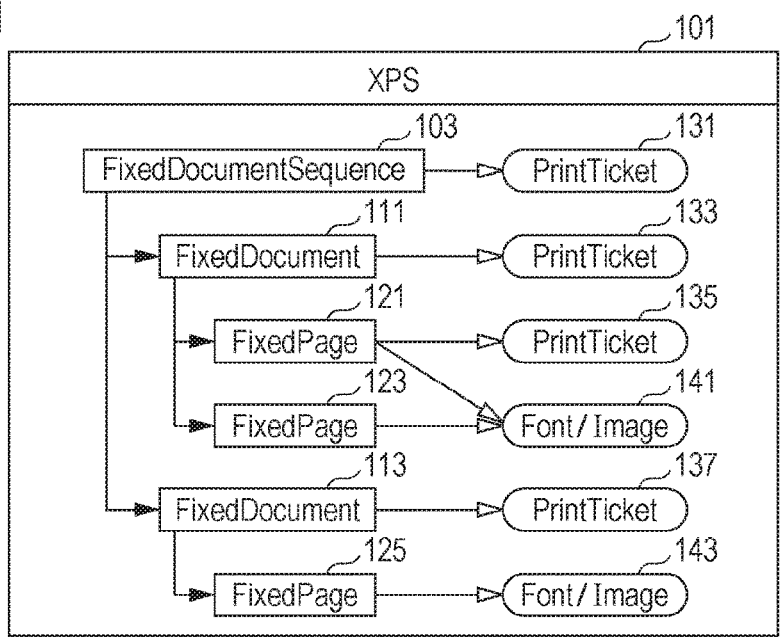
FIG. 1 is a conceptual diagram of an XPS logic structure.

FIG. 1 is an example of a block diagram illustrating the logic structure of an XPS document. The logic structure of an XPS document 101 is a tree structure with an FDS 103 as a root. The FDS 103 has an FD 111 and an FD 113 as children. The FD 111 has an FP 121 and an FP 123 as children. The FD 113 has an FP 125 as a child. As print setting information, the FDS 103 has a PT 131, the FD 111 has a PT 133, the FP 121 has a PT 135, and the FD 113 has a PT 137. The FP 123 and the FP 125 do not hold a PT. Also, the FP 121 and the FP 123 share resources 141 such as fonts or images. The FP 125 uses resources 143 such as fonts or images. Note that the actual XPS document is data obtained by compressing the above-described structured document of FIG. 1.

Here, a PT used at the time of printing the FP 121 is a PT obtained by merging the PT 131, the PT 133, and the PT 135. When monochrome is designated in the PT 135 of the FP 121 and the sheet size of A4 is designated in the PT 133 of the FD 111, the PT 135 and the PT 133 are merged at the time of printing the FP 121. As a result, the sheet size that has been insufficient in the PT 135 of the FP 121 is supplemented by the PT 133. The FP 121 is printed in monochrome, using the sheet size of A4.

Operation of Printer Driver

Figure 2:
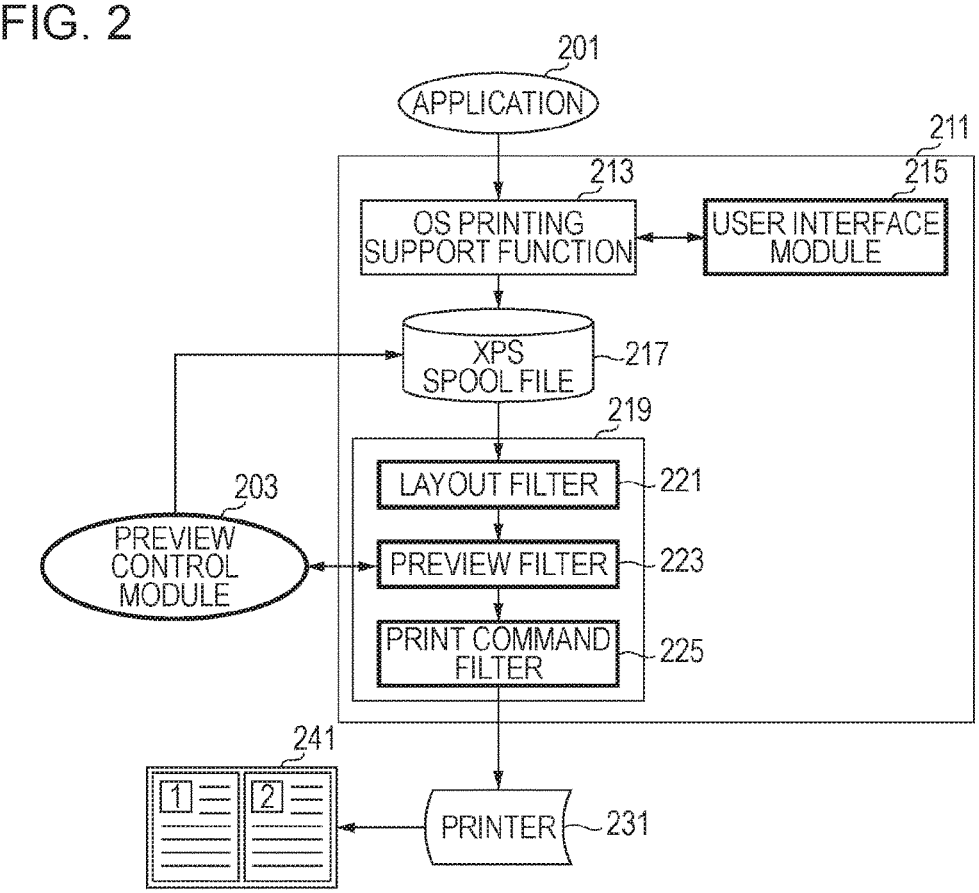
FIG. 2 is a block diagram illustrating an example of a printer driver of the present invention.

FIG. 2 is a block diagram of a document processing apparatus 211 including a printer driver of the present invention.

Modules regarding the present invention include a user interface module 215 with a print setting function, a filter group 219, and a preview control module 203. The filter group 219 is constructed of a layout filter 221 that lays out pages of an XPS document, a preview filter 223 for providing a preview function, and a print command filter 225 that converts an XPS document into a print command that can be analyzed by a printer. Here, a filter refers to a program that has a function of outputting certain data based on input data through steps of processing, conversion, non-conversion, generation, and the like.

In a print system in FIG. 2, data of each page of a document generated by an application 201 is temporarily accumulated as an XPS document in an XPS spool file 217 through an OS printing support function 213.

Then, the filter group 219 of the printer driver converts the XPS document accumulated in the XPS spool file 217 into a print command that can be analyzed by a printer, based on the print setting information, and supplies the print command to a printer 231, thereby executing a print process.

The user interface module 215 provides a function of setting a sheet size, a printing direction, and the like, which are generally used in printing. At the same time, the user interface module 215 of the present invention has a function of setting a preview that displays a print image before a printer starts a print operation. The user interface module 215 sends back print setting information in which set values of a plurality of print setting items are stored to the application 201.

At the time of printing a generated arbitrary document, the application 201 notifies the OS printing support function 213 of a print start, a print end, and print setting information that has been sent back from the user interface module 215 for setting print setting information. Also, the application 201 sends notifications of a rendering start and a rendering end of each page of a document.

The OS printing support function 213 stores details rendered by the application 201 and print setting information in the XPS spool file 217. Each filter is invoked by the OS printing support function 213 at the time of despooling a spooled XPS document.

The filter group 219 of the printer driver is constructed of one or more filters. The filter group 219 reads an XPS document from the XPS spool file 217 at the time of printing, converts the XPS document into a print command that can be analyzed by a printer, and supplies the print command to the printer 231.

Note that the configuration of the filter group 219 in the present embodiment may be such that a layout function and a preview function may be realized by a single filter, or an unnecessary filter may be removed. The present proposition is not limited to the filter configuration of FIG. 2.

The layout filter 221 receives an XPS document stored in the XPS spool file 217, performs a page layout process based on print setting information, and outputs the laid out XPS document. A layout process in the present embodiment includes N-up printing of printing a plurality of pages on a face of a single sheet, poster printing of enlarging a single page and printing the enlarged page on faces of a plurality of sheets, and the like.

The preview filter 223 includes the preview control module 203 which provides, to a user, a preview image based on the XPS document output from the layout filter 221 and the print setting information. The preview function of the present application can handle a plurality of XPS documents. Therefore, when an XPS document is added to the preview control module 203, further processing on the XPS document is not performed, and the processing ends. Accordingly, processing of a different XPS document is started, and a plurality of XPS documents can be added to the preview control module 203.

When a user who has confirmed the preview gives a print instruction, the preview control module 203 adds an XPS document for which the print instruction has been received to the XPS spool file 217. The preview setting of the XPS document added by the preview control module 203 is set to OFF. Accordingly, the XPS document is sent to the next print command filter 225 without the preview filter 223 performing a preview again.

In accordance with the XPS document output from the preview filter 223 and the print setting information, the print command filter 225 converts the XPS document into a print command that can be analyzed by a printer, and outputs the print command. When converting an input XPS document into image data, the print command filter 225 is also called a render filter. Render filters are often seen in printer drivers for inexpensive raster printers represented by inkjet printers. When the print command filter 225 operates as a render filter, the input XPS document is converted into image data. Thereafter, the image data is subjected to image processing such as color space conversion and binarization, and the processed image data is converted into a print command that can be analyzed by a raster printer.

In an advanced printer represented by a page printer, when XPS is included in types of print commands that can be analyzed by the printer, the print command filter 225 edits an input XPS document and outputs the edited XPS document. When it is unnecessary for the print command filter 225 to perform processing, needless to say, the input XPS document is output as it is, or the print command filter 225 is not necessarily included in the printer driver.

The printer 231, which is an output device, has a function of analyzing the print command generated by the print command filter 225 and forming a visible image for a print sheet. An example of the illustrated print result on a print sheet 241 indicates the case where the layout filter 221 has performed 2-up processing.

Note that, although data input and output among the filters is described as an XPS document in FIG. 2, the data is not restricted to an XPS document.

Preview Window of Preview Control Module

Figure 3:
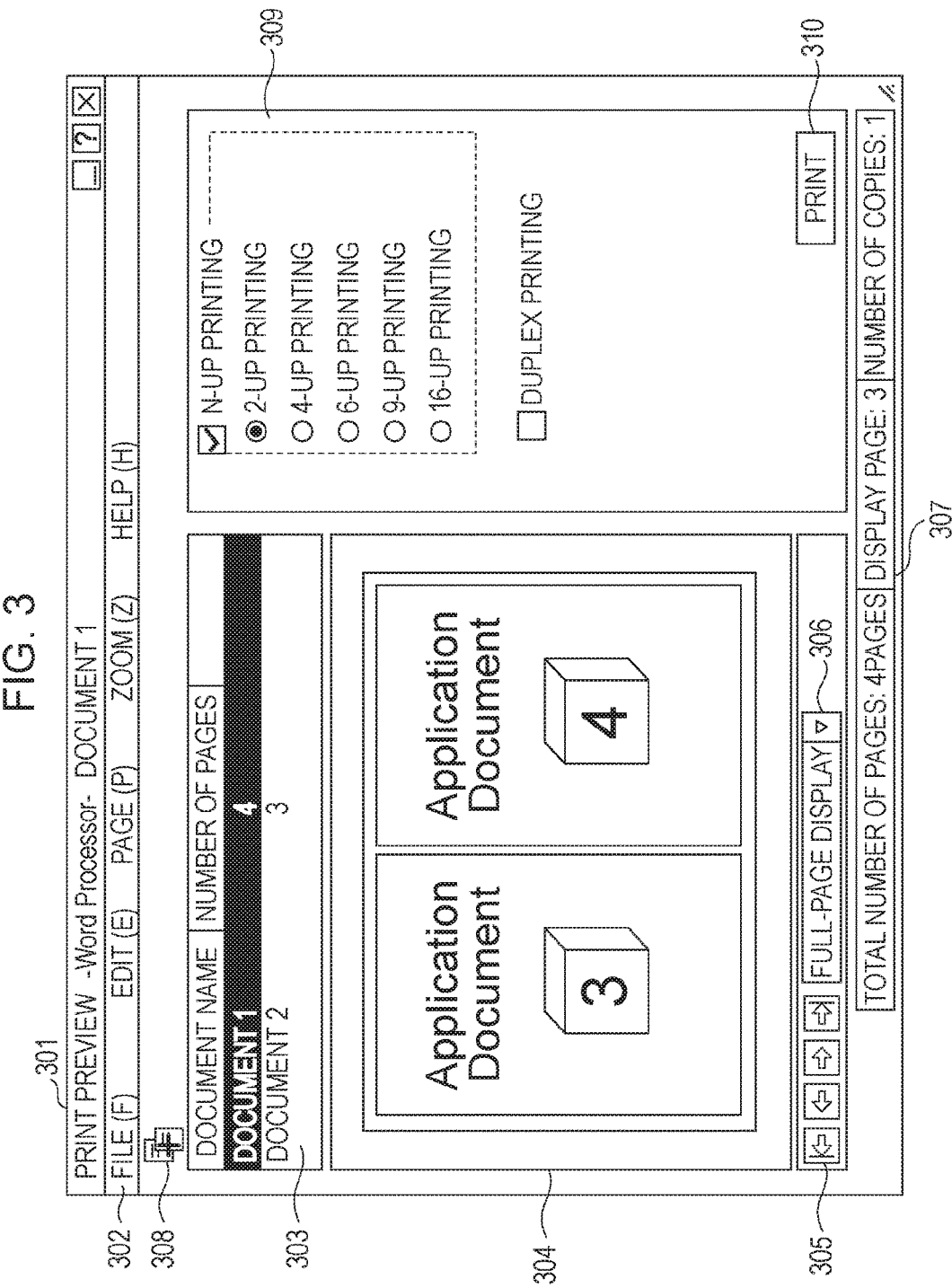
FIG. 3 is a diagram illustrating an example of a preview window of the present invention.

In FIG. 3, an example of a display screen (preview window) provided by the preview control module 203 in the present embodiment is illustrated. A print preview window 301 includes a display area for displaying a preview image, print setting information of an XPS document, or the like, and input means for changing, by a user, a preview image displaying method or the like.

A menu bar 302 includes a menu for giving a command to a previewer, such as display switching. A job list 303 displays a list of jobs (XPS documents in the present application) that can be processed by the preview control module 203. An XPS document selected in the job list 303 serves as a target to be displayed or printed. A preview display region 304 displays a print sheet and a visible image formed on the print sheet as a print image, using the details of an XPS file.

A region where user operation units 305 and 306 are prepared is a tool bar, and a user can easily perform switching of a preview page or the like by pressing the tool bar 305, without using the menu bar 302. The page switching buttons 305 include four buttons, and can change preview display to the first page, the previous page, the next page, or the last page.

The drop down list 306 is used at the time of changing the display size of a preview image, and full-page display, 100%, 200%, or the like can be selected. A display region 307 displays set values of representative setting items regarding print setting information of an XPS document being previewed. In FIG. 3, it is indicated that the total number of pages of the document is four pages, the page number currently being preview-displayed is page 3, and the number of copies set in the print setting information is one.

By pressing, by a user, a job combining button 308 in a state where a plurality of XPS documents are selected in the job list 303, the selected plurality of XPS documents are combined, and a combined print job (combined document) is generated. A print setting change region 309 accepts changes of print setting information for an XPS document(s) selected in the job list 303. Here, layout print setting (N-up print setting) that arranges a plurality of pages on a face of a single sheet and duplex print setting are possible. Alternatively, set values of other setting items may be set. Printing starts by pressing, by a user, a print button 310.

In the present embodiment, an XPS document accompanied by print setting information indicating that preview setting is ON is spooled, and a filter pipeline is activated by the OS printing support function 213. At the time the printer driver has activated the preview control module 203, the display screen illustrated in FIG. 3 is displayed. Note that, when the preview control module is already running, the XPS document accompanied by print setting information indicating that preview setting is ON is added to the preview control module, and the added XPS document is displayed in the job list 303.

Changes of Print Setting Information as a Result of Combining XPS Documents

As described above, an XPS document that is a print job can have a PT describing print setting information in each part. Also, each part of the XPS document can have no PT, and, if each part has a PT, it is not necessarily that all set values are described. Since a PT is used by being merged with a PT of the parent part that is a higher hierarchical level, if each part has no PT or there exists no set value desired to be referred to, print setting information of a PT of the parent part is used. That is, when there exists, in an FP, no print setting information desired to be referred to, print setting information of a PT of the parent FD is adopted. When there exists no corresponding print setting information in the parent FD, print setting information of the FDS is adopted. When there exists no print setting information in the FDS, user default set values describing all set values are used.

When a plurality of XPS documents that are print jobs are to be combined, a plurality of FDs and FPs can be maintained in the XPS documents. Therefore, PTs can also be added.

In contrast, since an XPS document can have only one FDS, when XPS documents that are print jobs are to be combined, it is necessary to determine which XPS document's FDS is to be used, or it is necessary to use a newly generated FDS. At that time, an FD and an FP whose parents FDSs have changed have different PTs used for merging. Therefore, print setting information may change before combining.

Figure 4A:
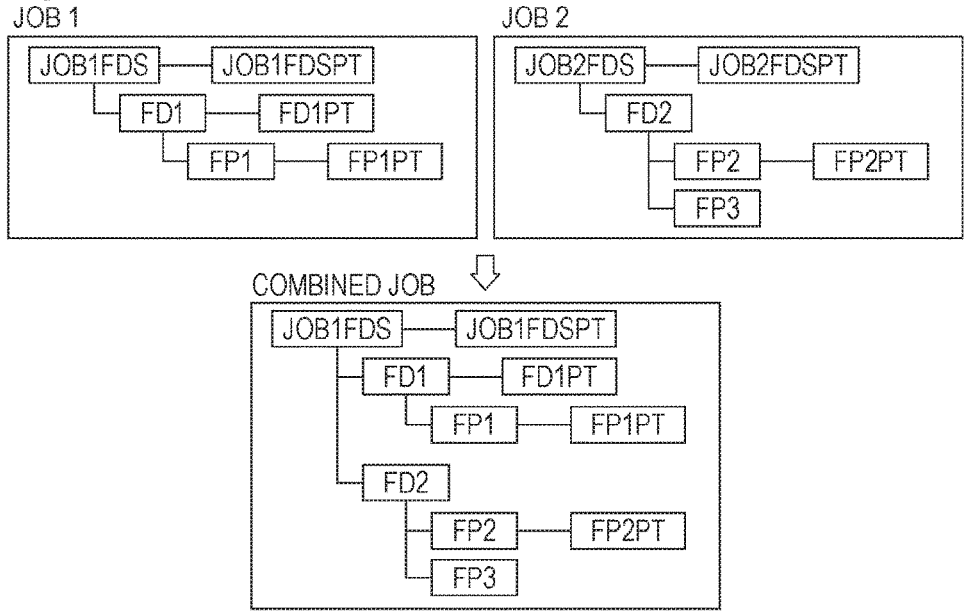
FIGS. 4A and 4B are diagrams illustrating replacement of PrintTickets of FixedPages of the present invention.

In FIG. 4A, an example of combining XPS documents is illustrated. A job 1 has one FP (FP1), has FD1 as the parent FD of the FP, and has JOB1FDS as the parent FDS of FD1. JOB1FDS, FD1, and FP1 have, as PTs, JOB1FDSPT, FD1PT, and FP1PT, respectively.

A job 2 has two FPs (FP2 and FP3), has FD2 as the parent FD of FP2 and FP3, and has JOB2FDS as the parent FDS of FD2. JOB2FDS and FP2 have JOB2FDSPT and FP2PT, respectively.

When the job 2 is combined with the job 1 serving as a base, a method of adding parts including FD2 and therebelow as child elements of JOB1FDS is conceivable. Accordingly, a combined job is generated.

Here, print setting information of each page (FP) will be considered. Regarding FP1 that has originally existed in the job 1, details of the PT do not change, and print setting information obtained by merging JOB1FDSPT, FD1PT, and FP1PT is used.

In contrast, print setting information of FP2 is print setting information obtained by merging JOB2FDSPT and FP2PT in the job 2 before combining. As a result of combining, print setting information obtained by merging JOB1FDSPT and FP2PT is used. This is because, as a result of combining the job 1 and the job 2, the FDS of the combined XPS document becomes JOB1FDS, and the FDS to which FP2 should refer to changes from JOB2FDS to JOB1FDS.

Similarly, the PT of FP3 in the job 2 before combining is JOB2FDSPT. FP3 after combining uses JOB1FDSPT as print setting information.

Here, when the details of JOB1FDSPT and JOB2FDSPT are different, items of print setting information of FP2 and FP3 are different before and after combining.

Thus, at the time an XPS document that is a print job is to be added to a previewer, for each FP, a user default PT, the PT of the parent FDS, the PT of the parent FD, and the PT of the FP are merged to generate a PT, and this PT replaces the PT of the FP. Accordingly, the PT held by the FP maintains all the set values used in the FP, and information is prevented from being lost as a result of combining.

Figure 4B:
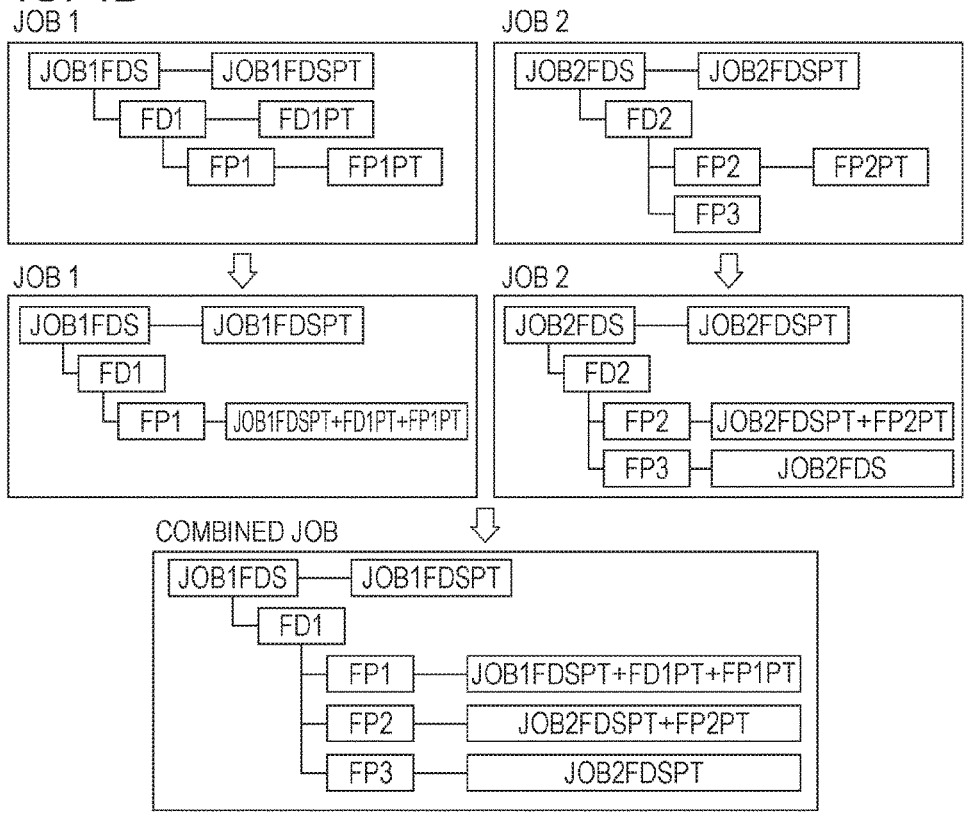

In FIG. 4B, an example of combining XPS documents in which PTs obtained as a result of merging are arranged in FPs is illustrated. Firstly, the PT of each FP is merged with the PT of the parent part. In the job 1, in order to generate a PT to be added to FP1, the PT (FP1PT) of FP1, the PT (FD1PT) of FD1 which is the parent FD of FP1, the PT (JOB1FDSPT) of JOB1FDS which is the parent FDS, and the user default PT are merged. Note that, since the user default PT is commonly used in all merging processes, an illustration thereof is omitted. The generated PT (JOB1FDSPT+FD1PT+FP1PT) replaces the PT of FP1.

Similarly, merging with the PT of the parent part is performed in the job 2 except for parts where there exists no PT. That is, since there exists no PT in FD2 which is the parent FD of FP2, the PT (FP2PT) of FP2, a PT to be added to FP2 is generated by merging the PT (JOB2FDSPT) of JOB2FDS which is the parent FDS, and the user default PT.

Similarly, since there exists no PTs in FP3 and FD2, a PT to be added to FP3 is generated by merging the PT (JOB2FDSPT) of JOB2FDS which is the parent FDS and the user default PT.

The generated PTs (JOB2FDSPT+FP2PT and JOB2FDSPT) are added as PTs of FP2 and FP3, respectively. When there preexists a PT in an FP, the existing PT is replaced by a generated PT. Accordingly, print setting information of each page can be obtained using only PTs held by FPs.

Here, when the job 1 and the job 2 in which PTs of FPs are replaced are combined, a combined job of FIG. 4B is generated. Since the parent FDS has been changed to JOB1FDS in FP2 and FP3 added to the job 1, the PT of the parent FDS has also been changed from JOB2FDSPT to JOB1FDSPT. However, because the PT generated beforehand by merging with JOB2FDSPT has been held, even if the PT of the parent FDS changes, print setting information applied to a page remains unchanged.

In FIG. 5, an example of the flowchart of a process of replacing a PT of an FP with a merged PT is illustrated. Note that each step of the flowchart of the present application is realized by reading, by a CPU of an information processing apparatus (PC), a related program from a memory and executing, by the CPU, the program. Note that the process in FIG. 5 may be executed when an XPS document preview instruction is given or when a combining instruction is given. Note that it is descried in the preset application that the process is executed when a preview instruction is given.

In S101, the preview control module 203 obtains the FDS of an XPS document for which a preview instruction is given. In S103, the preview control module 203 generates a job level PT. A job level PT generation process will be described later using FIG. 6.

Next, in S105, the preview control module 203 obtains an FD of the XPS document being processed. Since the XPS document may have a plurality of FDs, the preview control module 203 determines, in S107, whether an FD has been obtained. The preview control module 203 repeats the processing until no FD is obtained, thereby performing processing on all FDs.

In S109, the preview control module 203 generates a document level PT. A document level PT generation process will be described later using FIG. 7.

Next, in S111, the preview control module 203 obtains an FP of the XPS document being processed. Here, a child FP of the FD obtained in S105 is obtained. As is the case with FDs, whether an FP has been obtained is determined in S113 in order to perform processing on all FPs. When an FP has been obtained, the flow proceeds to S121, and, when no FP has been obtained, the flow proceeds to S131.

In S121, the preview control module 203 generates a page level PT. A page level PT generation process will be described later using FIG. 8. A PT that has been generated at this time is a PT obtained by merging the user default PT, the PT of the parent FDS, the PT of the parent FD, and the PT of the FP being processed.

In S123, the preview control module 203 replaces the PT of the FP being processed with the generated PT. When a replacement process of one FP is completed, the flow returns to S111, and the next FP is obtained.

In S131, since processing on all child FPs of the FD being processed is completed, the preview control module 203 deletes the PT of the FD being processed, and, in S105, obtains the next FD. Note that S131 may not be executed, as occasion calls, such as when it is necessary to obtain print setting information on a document level. When processing on all FDs is completed and no FD can be obtained in S105, the preview control module 203 terminates the process of replacing PTs of FPs.

With this process, PTs generated as a result of merging with the PTs of the parent parts are added to all FPs, and print setting information of pages can be maintained by using only the PTs of the FPs.

PT Merging Process

FIG. 6 illustrates an example of a job level PT generation process. In S201, the preview control module 203 executes a process of obtaining a PT of user default print setting information. In S203, the preview control module 203 obtains a PT of the obtained FDS. Since a PT does not necessarily exist in the FDS, when a PT of the FDS has been obtained, the flow proceeds to S207, and, when no PT of the FDS has been obtained, the flow proceeds to S211.

In S207, the preview control module 203 determines whether the PT obtained in S203 is an empty PT. When print setting information is described, the flow proceeds to S209. When the PT is an empty PT, the flow proceeds to S211.

In S209, the preview control module 203 merges the PT of the user default print setting information and the PT of the FDS to generate a job level PT.

Also, when the preview control module 203 determines that there exists no PT in the FDS or the PT is an empty PT and there exists no PT in the FDS, the preview control module 203 regards, in S211, that the PT of the user default print setting information as a job level PT.

FIG. 7 illustrates an example of a document level PT generation process. In S301, the preview control module 203 executes a process of obtaining a PT of the FD of the XPS document being processed. In S303, the preview control module 203 determines whether a PT of the FD has been obtained.

When a PT of the FD has been obtained, the preview control module 203 determines, in S305, whether the obtained PT is an empty PT. When print setting information is described, the flow proceeds to S307. When the PT is an empty PT, the flow proceeds to S309.

In S307, the preview control module 203 merges the job level PT and the obtained PT of the FD to generate a document level PT. In S309, since there exists no PT in the FD, the preview control module 203 regards the job level PT as a document level PT. Since the FDS is obtained before the FD at the time XPS parts are obtained, needless to say, a job level PT is already generated before a document level PT is generated.

Figure 8:
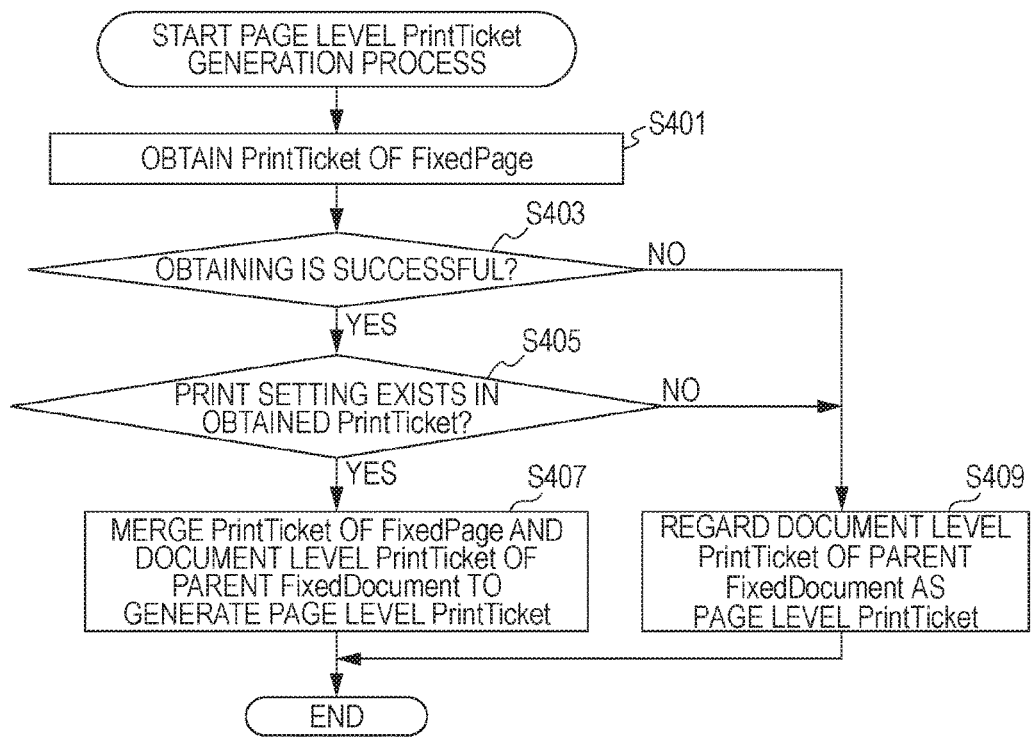
FIG. 8 is a diagram illustrating an example of a page level PT generation process of the present invention.

FIG. 8 illustrates an example of a page level PT generation process. In S401, the preview control module 203 executes a process of obtaining a PT of the FP obtained in S111. In S403, the preview control module 203 determines whether a PT has been obtained.

When a PT has been obtained, the preview control module 203 determines whether the obtained PT is an empty PT. When print setting information is described, the flow proceeds to S407. When the PT is an empty PT, the flow proceeds to S409.

In S407, the preview control module 203 merges the document level PT of the parent FD of the FP being processed and the obtained PT of the FP to generate a page level PT.

In 409, since there exists no PT in the FP, the preview control module 203 regards the document level PT of the parent FD as a page level PT. Since the parent FD of this FP is obtained before this FP is obtained, needless to say, a document level PT of the parent FD is already generated before a page level PT is generated.

Note that the processes from FIG. 5 to FIG. 8 are executed before a plurality of XPS documents are combined, which will be described later.

Document Combining Process

Figure 9A:
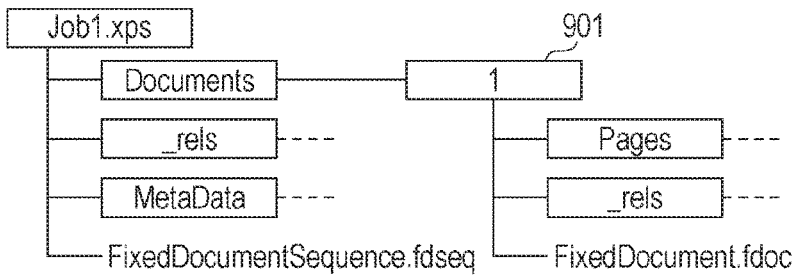
FIGS. 9A to 9C are diagrams illustrating an example of a folder configuration at the time of combining structured documents of the present invention.
Figure 9B:
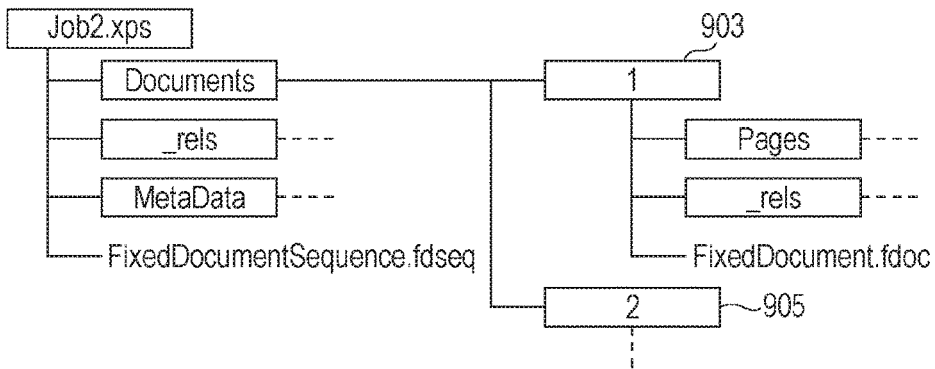
Figure 9C:
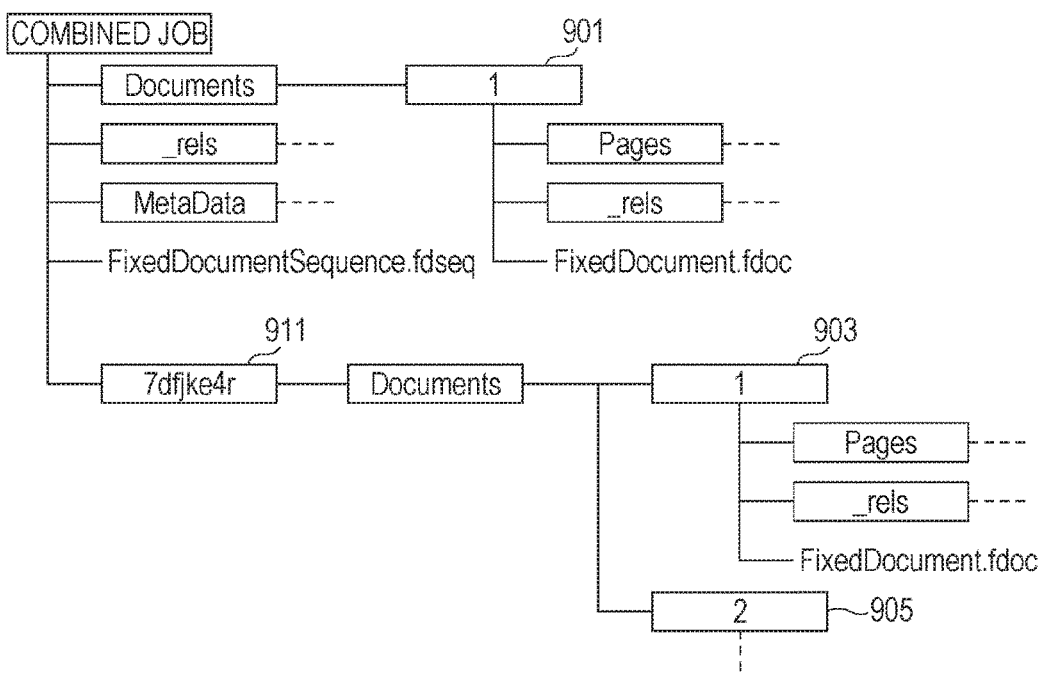

In FIGS. 9A to 9C, an example of the configuration of a combined document generated by combining a plurality of XPS documents is illustrated. Here, an XPS document (Job 1) of FIG. 9A and an XPS document (Job 2) of FIG. 9B are combined to generate a combined XPS document of FIG. 9C. In each of the XPS documents, besides an FDS, FDs, and FPs, resources such as images or fonts, and PTs exist. The relationship among these parts is described in the FDS, FDs, and FPs, and in a rels file describing the relationship. Thus, the arrangement of the parts can be freely performed.

When Job 1 of FIG. 9A and Job 2 of FIG. 9B are to be combined, a method of adding the parts of one XPS document to the other XPS document is conceivable. Here, the parts of Job 2 are added to Job 1. When combining is performed, a folder 911 with a unique name is generated in a root of Job 1. This is utilized as a place where the parts of Job 2 to be added are placed. Accordingly, the names of the parts of Job 1 and Job 2 are prevented from overlapping. Also, by using the generated folder 911 as a root, the parts can be added without greatly changing the configuration of Job 2.

FIG. 9C illustrates the combined XPS document after the parts are added. Folders 903 and 905 storing pages of Job 2 are arranged in the folder 911 generated in Job 1. The configuration of the folder 901 storing pages existing in Job 1 does not change. By rewriting the FDS, FDs, and FPs in accordance with the added parts, the parts of Job 2 are associated with Job 1, and a combined document is generated.

Figure 10:
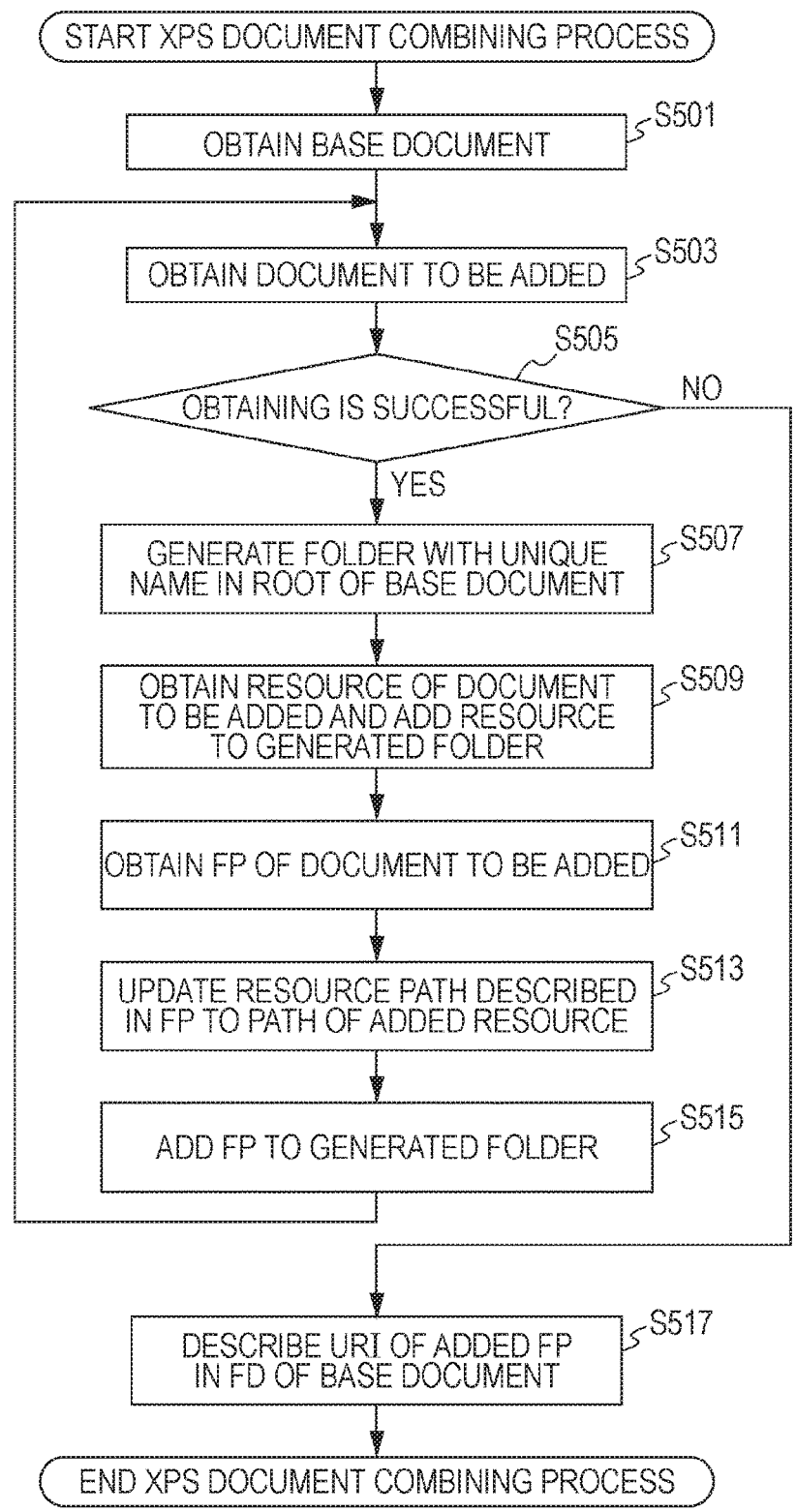
FIG. 10 is a diagram illustrating an example of a structured document combining process of the present invention.

In FIG. 10, an example of the flowchart of a process of combining XPS documents is illustrated.

Firstly in S501, the preview control module 203 obtains a base document. A base document serves as a base at the time of combining, as in FIG. 9A, and receives the parts of another document to be added. For example, it is conceivable that, when jobs to be combined are selected in the job list 303 in FIG. 3, the job at the top or the job selected at first may serve as a base document. Combining is performed in a manner that the parts of a document to be added are added to the base document. Therefore, as the FDS, the FDS of the base document is used, and, as the PT of the FDS which serves as print setting information of a job, the PT of the FDS of the base document is used.

Next, in S503, the preview control module 203 obtains a document to be added. Since a plurality of documents to be added may exist, the processing from S503 to S515 is repeated until all the documents are combined.

In S505, the preview control module 203 determines whether a document to be added has been obtained. When a document to be added has been obtained, the flow proceeds to S507, and a folder with a unique name is generated in a root of the base document. This folder is used for placing the parts of the document to be added. The names of the parts of an XPS document are often the same as those of a different XPS document. When documents are to be combined, the parts with the same name cannot be placed in the same place. Thus, a folder where the parts are added is generated for each document to be added, and the parts of the document to be added are placed in that folder, thereby preventing the names of the parts from overlapping. Also, in the present embodiment, it is described that a folder for placing the parts of a document to be added is placed in a root of the base document. However, such a folder can be generated at any place, as long as the place is a place that prevents the names from overlapping. Alternatively, needless to say, a method of uniquely changing the names of the individual parts without generating a folder may be used.

Next, in S509, the preview control module 203 obtains the resources of the document to be added, and adds the resources, without changing the configuration, using the folder generated in S507 as a root. The resources described here are images or fonts and are used in an FP.

When all the resources are added to the base document, in S511, the preview control module 203 obtains an FP of the document to be added, and the flow proceeds to S513. In the FP, the place (hereinafter URI) where the resources in use are placed is described. The resources of the document to be added are placed in the folder generated in S507, and the URI is different from that at the time the resources were placed in the document before being added. Therefore, the FP cannot be used as it is. Thus, in S513, the preview control module 203 overwrites the URI of the resources described in the FP of the document to be added with the URI of the resources added to the base document.

Next, in S515, the preview control module 203 adds the FP where the URI of the resources has been updated to the base document. As is the case with the resources, it is assumed that the FP is added, without changing the configuration before the addition, by using the folder for addition generated in the base document as a root. However, when the names do not overlap, the FP may be added to a different place. Note that editing of the FP may become necessary in accordance with the place where the FP is placed.

When addition of all FPs in the single document to be added is completed, the flow returns to S503, and the preview control module 203 obtains another document to be added. When another document to be added is obtained, the processing from S507 to S515 is executed again. When addition of the resources and FPs of all documents to be added is completed, in S517, all the URIs of the added FPs are described in an FD of the base document. Accordingly, the added FPs are associated with the base document, and the pages of the document(s) to be added are added to the base document.

In the present embodiment, only the FPs and the resources of the document(s) to be added are added to the base document. Alternatively, FDs may be additionally added. In that case, the documents can be combined by describing the URIs of the added FDs in the FDS of the base document.

According to the present embodiment, since the PT of each FP is generated based on the PT of the parent part before a plurality of documents are combined, even when a plurality of documents are combined, print setting information applied to each page can be prevented from changing before and after the documents are combined.

Second Embodiment

In the first embodiment, by adding PTs describing all set values to FPs, page level print setting information can be obtained only from the PTs of the FPs, and print setting information at the time of combining can be maintained. However, since PTs are added to all FPs, the processing load on software such as a printer driver that handles PTs may increase. Thus, in the present embodiment, in addition to the technique in the first embodiment, a technique of minimizing the arrangement of PTs is proposed.

Figure 11A:
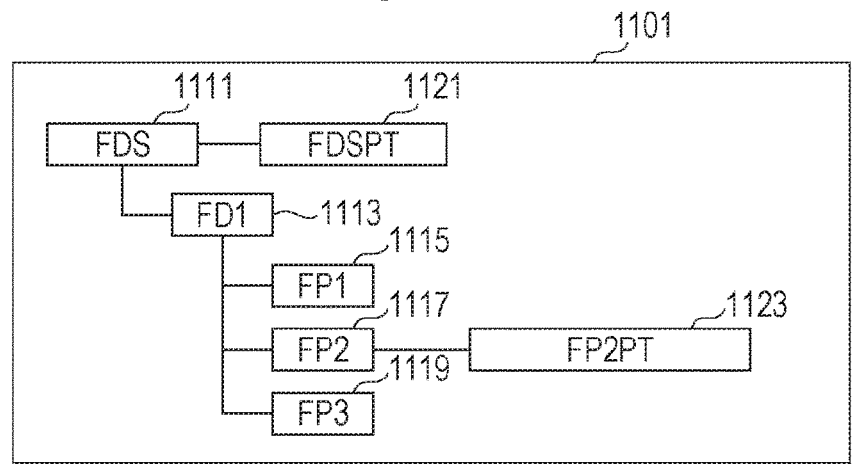
FIGS. 11A to 11C are diagrams illustrating replacement of PrintTickets of FixedPages of the present invention.
Figure 11B:
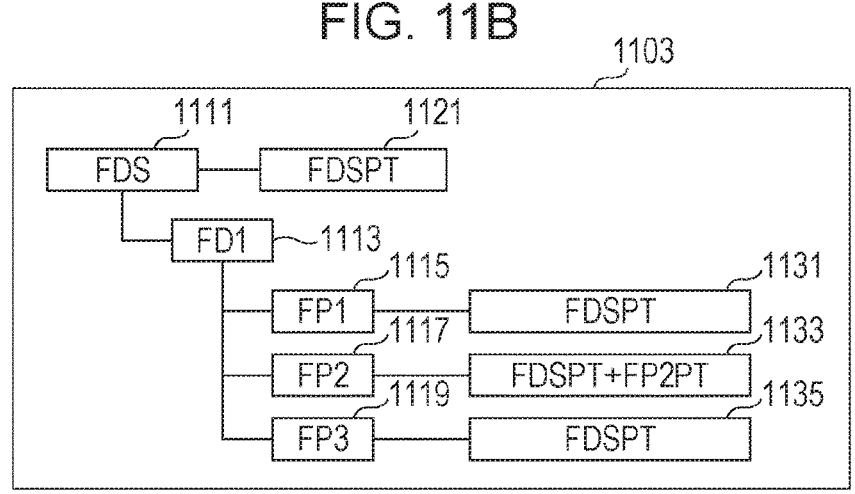
Figure 11C:
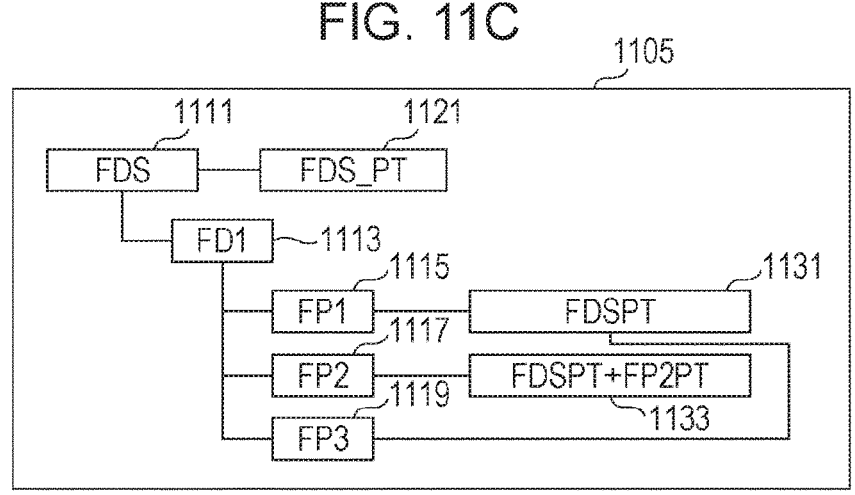

The difference between the first embodiment and the second embodiment in the configuration of an XPS document after PTs of FPs are replaced will be described using FIGS. 11A to 11C. As in FIG. 11A, when PTs exist only in FDS(1111) and FP2(1117), FIG. 11B is generated by adding the PTs to FPs using the technique in the first embodiment. That is, as illustrated in FIG. 11B, PT(1131) generated by merging PT(1121) of FDS(1111) and a user default PT is added to FP1(1115). Similarly, PT(1133) generated by merging PT(1123) of FP2(1117), PT(1121) of FDS(1111), and the user default PT is added to FP2(1117). PT(1135) generated by merging PT(1121) of FDS(1111) and the user default PT is added to FP3(1119).

Here, in FIG. 11B, the PT generated by merging the same PTs is added to FP1(1115) and FP3(1119). Regarding this, as illustrated in FIG. 11(c), it becomes unnecessary to generate a new PT by generating only PT(1131) generated by merging PT(1121) of FDS(1111) and the user default PT(1131) and by associating FP3(1119) with PT(1131) added to FP1(1115). Accordingly, the processing load involved in generation of a PT by merging can be alleviated. Also, for software that handles an XPS document where PTs have been replaced, because the number of PTs that are required to be analyzed decreases, the processing load decreases, and it can be expected that the performance will be improved.

Figure 12:
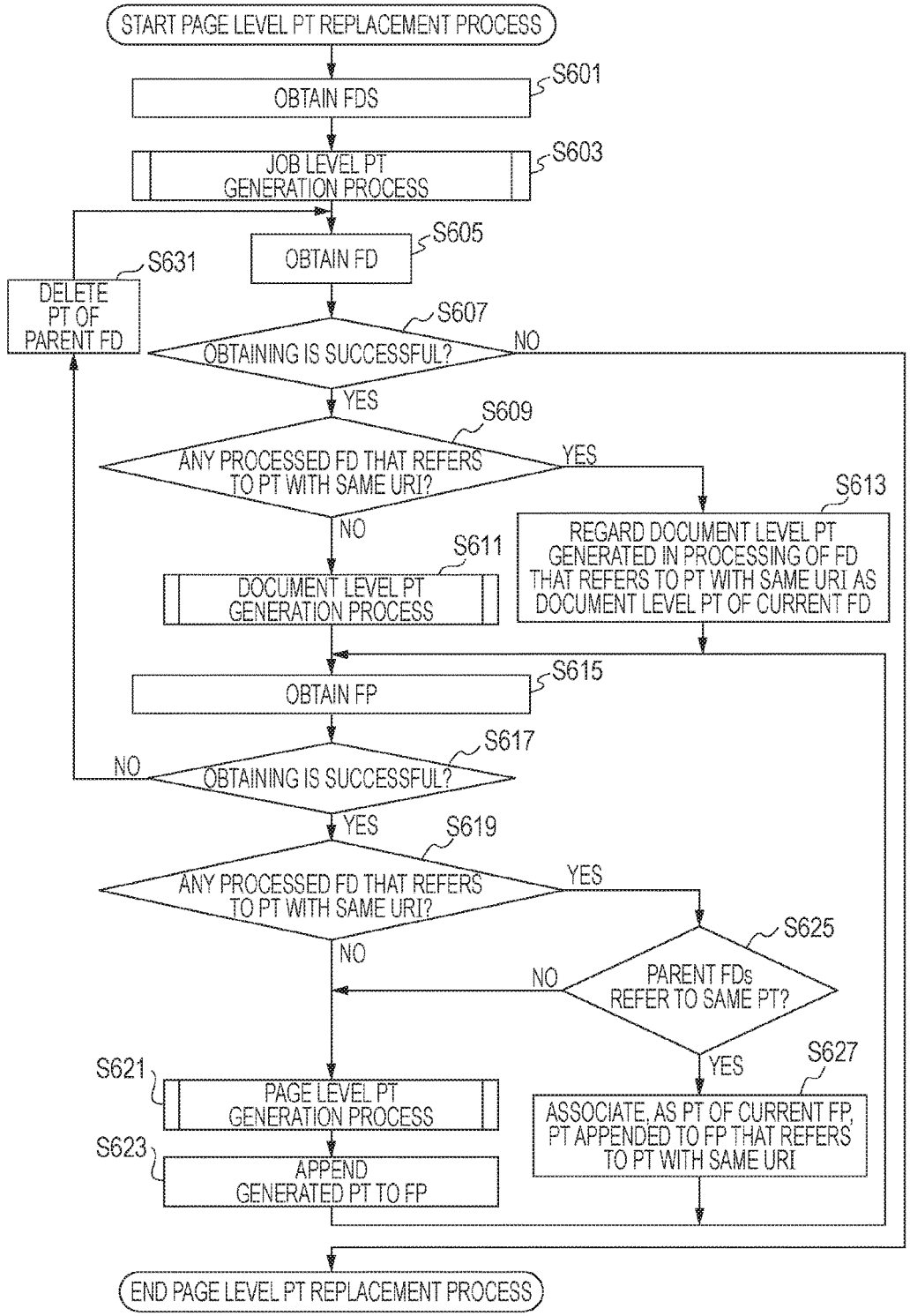
FIG. 12 is a diagram illustrating replacement of PrintTickets of FixedPages of the present invention.

FIG. 12 illustrates an example of the flowchart illustrating a process of replacing PTs of FPs according to the second embodiment. Since the same processing as S101 to S107 of the first embodiment is performed in S601 to S607, a description thereof is omitted.

When it is determined in S607 that an FD has been obtained, the preview control module 203 determines, in S609, whether there exists, among already-processed FDs, an FD that refers to a PT with the same URI. This corresponds to FDs where there exist no PTs. When there exists no FD that refers to a PT with the same URI, the flow proceeds to S611, and generation of a document level PT is performed.

When there exists a FD that refers to a PT with the same URI, the flow proceeds to S613, and the preview control module 203 regards a document level PT generated in processing of the corresponding FD as a document level PT of the FD currently being processed. When the document level PT is determined, in S615, the preview control module 203 obtains a child FP of the obtained FD.

In S617, the preview control module 203 determines whether a child FP has been obtained. When a child FP has been obtained, the flow proceeds to S619. When no child FP has been obtained, the flow proceeds to S631. In S619, the preview control module 203 determines whether there exists, among already-processed FPs, an FP that refers to the same PT as the PT to which the obtained FP refers. When there exists no such FP, the preview control module 203 generates a page level PT, and, in S623, the preview control module 203 adds the generated PT as a PT of the FP.

When there exists an FP that refers to the same PT, in S625, the preview control module 203 determines whether the parent FDs of both the corresponding FP and the FP currently being processed refer to the same PT. When the parent FDs refer to different PTs, the preview control module 203 generates a page level PT and adds the page level PT to the FP in S621 and S623.

When the parent FDs refer to the same PT in S625, because both the FDs refer to the same PT and both the FPs refer to the same PT, the preview control module 203 generates the same PT as a result of merging. Thus, in S627, the preview control module 203 associates the FP currently being processed (such as FP3(1119) in FIG. 11) with the already generated PT (such as PT1131 in FIG. 11) of the FP. When a page level PT is determined, the flow proceeds to S615, and another FP is obtained. When an FP has been obtained, S619 to S627 are performed, and a PT to be added to the FP is determined. When processing of all child FPs of the current FD is completed, the flow returns to S605, and the next FD is obtained. When an FD has been obtained, processing up to S627 is repeated. When processing of all FDs is completed, and when no FD can be obtained, the process of replacing PTs of FPs is terminated.

Accordingly, once generated document level PTs and page level PTs are not generated twice, resulting in reduction of the processing load. Also, because the number of PTs processed by software that handles PTs decreases, the processing load on the software decrease. It can be expected that the performance of the two will be improved.

Note that, in the present embodiments, unification is achieved by adding the PT of an FDS to the PT of a page, and allowing an FP of a different page to refer to that PT. However, this can be substituted by adding the PT of an FDS to an FD, and allowing an FP of each page to refer to that PT.

Other Embodiments

Also, the present invention can be realized by executing the following process. That is, this is the process in which software (program) that realizes the functions of the above-described embodiments is supplied to a system or an apparatus via a network or various recording media, and a computer (CPU, MPU, or the like) of the system or apparatus reads and executes the program.

According to the present invention, when structured documents that are print jobs are combined, each page maintains print setting information set before combining, and a user's intended print result can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A document processing apparatus, comprising:
   an obtaining unit configured to obtain first and second document data, wherein the first document data includes a first element and first print setting information in association with each other in a higher hierarchical level, and a third element in a lower hierarchical level, and wherein the second document data includes a second element and second print setting information in association with each other in the higher hierarchical level, and a fourth element in the lower hierarchical level;
   a display control unit configured to cause a display apparatus to display a setting screen;
   a combining unit configured to generate combined document data based on the first and second document data if a combining instruction is input on the displayed setting screen, and
   wherein the higher hierarchical level of the combined document data includes the first element and the first print setting information and neither includes the second element nor the second print setting information, and
   wherein the lower hierarchical level of the combined document data includes the second print setting information and the fourth element, and
   a printing control unit configured to cause an image forming apparatus to print based on user operation on the displayed setting screen,
   wherein the obtaining unit, the display control unit, the combining unit and the print control unit are implemented by a processor and a memory.

2. The apparatus according to claim 1, wherein the setting screen includes a preview image of document data selected from the first and the second document data.

3. The apparatus according to claim 1, wherein the first print setting information is different from the second print setting information.

4. The apparatus according to claim 1, wherein the third and fourth elements are a page element, and the first and second elements are a job element.

5. The apparatus according to claim 1, wherein the first and second document data are document data in an XML Paper Specification format, and the print setting information is PrintTicket.

6. A document processing method, comprising:
   obtaining first and second document data, wherein the first document data includes a first element and first print setting information in association with each other in a higher hierarchical level, and a third element in a lower hierarchical level, and wherein the second document data includes a second element and second print setting information in association with each other in the higher hierarchical level, and a fourth element in the lower hierarchical level;
   causing a display apparatus to display a setting screen;
   generating combined document data based on the first and second document data if a combining instruction is input on the setting screen;
   wherein the higher hierarchical level of the combined document data includes the first element and the first print setting information and neither includes the second element nor the second print setting information, and
   wherein the lower hierarchical level of the combined document data includes the second print setting information and the fourth element in association with each other; and
   causing an image forming apparatus to print based on user operation on the displayed setting screen.

7. The document processing method according to claim 6, wherein the setting screen includes a preview image of document data selected from the first and the second document data.

8. The document processing method according to claim 6, wherein the first print setting information is different from the second print setting information.

9. The document processing method according to claim 6, wherein the third and fourth elements are a page element, and the first and second elements are a job element.

10. The document processing method according to claim 6, wherein the first and second document data are document data in an XML Paper Specification format, and the print setting information is PrintTicket.

11. A non-transitory computer-readable storage medium storing a program that causes a computer to perform a document processing method, the program comprising:
    obtaining first and second document data, wherein the first document data includes a first element and first print setting information in association with each other in a higher hierarchical level, and a third element in a lower hierarchical level, and wherein the second document data includes a second element and second print setting information in association with each other in the higher hierarchical level, and a fourth element in the lower hierarchical level;
    causing a display apparatus to display a setting screen;
    generating combined document data based on the first and second document data if a combining instruction is input on the setting screen;
    wherein the higher hierarchical level of the combined document data includes the first element and the first print setting information and neither includes the second element nor the second print setting information, and
    wherein the lower hierarchical level of the combined document data includes the second print setting information and the fourth element in association with each other; and
    causing an image forming apparatus to print based on user operation on the displayed setting screen.

12. The non-transitory computer-readable storage medium according to claim 11, wherein the setting screen includes a preview image of document data selected from the first and the second document data.

13. The non-transitory computer-readable storage medium according to claim 11, wherein the first print setting information is different from the second print setting information.

14. The non-transitory computer-readable storage medium according to claim 11, wherein the third and fourth elements are a page element, and the first and second elements are a job element.

15. The non-transitory computer-readable storage medium according to claim 11, wherein the first and second document data are document data in an XML Paper Specification format, and the print setting information is Print-Ticket.

\* \* \* \* \*